United States Patent [19]

Kidder

[11] Patent Number: 5,230,430
[45] Date of Patent: Jul. 27, 1993

[54] STERILIZABLE BAG

[75] Inventor: John W. Kidder, Aromas, Calif.

[73] Assignee: Amycel, Inc., Avondale, Pa.

[21] Appl. No.: 826,025

[22] Filed: Jan. 24, 1992

[51] Int. Cl.⁵ .............................................. B65D 85/50
[52] U.S. Cl. .................................. 206/484.1; 47/1.1;
53/463; 206/439; 383/107
[58] Field of Search ................ 53/415, 425, 461, 463,
53/464; 47/1.1; 206/439, 484.1; 383/106–108

[56] References Cited

U.S. PATENT DOCUMENTS

| | | | |
|---|---|---|---|
| 3,370,780 | 2/1968 | Shaw | 383/107 |
| 3,468,471 | 9/1969 | Linder | 206/439 |
| 3,685,720 | 8/1972 | Brady | 206/439 |
| 3,768,725 | 10/1973 | Pilaro | 206/439 |
| 3,819,106 | 6/1974 | Schuster | 206/439 |
| 3,938,658 | 2/1976 | Rohde | |
| 4,022,324 | 5/1977 | Schuster | 53/415 |
| 4,057,144 | 11/1977 | Schuster | 206/439 |
| 4,059,919 | 11/1977 | Green | |
| 4,063,383 | 12/1977 | Green | 47/1.1 |
| 4,270,658 | 6/1981 | Schuster | 206/484.1 |

FOREIGN PATENT DOCUMENTS

| | | | |
|---|---|---|---|
| 7412980 | 4/1976 | Netherlands | 206/439 |
| 1488326 | 10/1977 | United Kingdom | 206/439 |
| 2025894 | 1/1980 | United Kingdom | 206/439 |

Primary Examiner—Jimmy G. Foster
Attorney, Agent, or Firm—Cooley Godward Castro Huddleson & Tatum

[57] ABSTRACT

The invention relates to a sterilizable bag including a large transparent, heat-sealable plastic sheet closed by a filter strip comprising a three ply laminate in which a central layer is a microporous plastic, a second layer provides strength and a third layer provides a heat-sealable surface for bonding to the transparent plastic sheet to close and seal the bag.

21 Claims, 1 Drawing Sheet

STERILIZABLE BAG

TECHNICAL FIELD

The present invention relates to a sterilizable bag and a method of making a mushroom spawn bag.

BACKGROUND

Sterilizable bags are known in the art for storing a variety of products under sterile conditions, for example, U.S. Pat. Nos. 4,059,919 and 4,063,383. In some instances, such as in the production of mushroom spawn, the bag must be permeable to allow the mushroom mycelium and spawn ingredients, including the growing medium, to maintain a desired moisture content and to receive oxygen for growth and to expel byproduct carbon dioxide. Presently, mushroom spawn is grown on a sterile substrate medium, such as hydrated grain, for example, wheat, rye, millet, barley straw or the like in bags. The bags are usually made of plastics, such as polyethylene, polypropylene, nylon and the like. The plastic used, e.g., polyethylene, is often weak and tears easily. Also, the porosity of the bag may be easily destroyed if the bag is heat sealed.

Usually, a large area comprising as much as 40%-45% of the bag is permeable to gases and this usually means that the bag does not maintain the desired oxygen and moisture content of the substrate satisfactorily resulting in excess air penetration drying out the hydrated substrate or insufficient air penetration which inhibits growth. Also, a large filter area reduces the view area of the bag. In another bag, a small Tyvek patch is placed in the header space, a void area above the mushroom spawn in the bag requiring vertical storage of the bag. Tyvek a high gas exchange rate with moderate filtration but poor tolerance to temperature above 120° C. needed for sterilization. Often when trying to overcome the deficiencies prior art bags, the proposed construction is complicated and requires large amounts of different specialized materials.

Accordingly, there is a need for a new type of prior art bags.

SUMMARY OF THE INVENTION

The invention is directed to a sterilizable bag comprising (1) a sheet of transparent, heat-sealable, non-permeable plastic sheet material having the side edges folded over to provide adjacent side edges and non-adjacent self-contacting end edges; and (2) a laminated plastic filter strip in contact with both of said adjacent side edges comprising:
  (a) a central sheet of a microporous plastic sheet permeable to gas, e.g. moist air, and impermeable to water,
  (b) an externally facing sheet of permeable plastic, and
  (c) an internally facing sheet of permeable plastic, at least one of (b) and (c) contacting said transparent sheet being heat-sealable, said filter strip being relatively narrow in width as compared to its length, said length extending the length of the bag at said adjacent edges; and wherein one of said self-contacting end edges has been heat sealed and said side edges of said transparent sheet have been heat sealed to said filter strip, thereby defining an open-ended bag area.

Preferably, said filter strip has a gas exchange rate determined by the bag mass and bag contents to provide for a desired rate of gas exchange without desiccation of said bag contents.

The resulting bag is very tough and can withstand various mechanical procedures, including shaking of the bag to redistribute mushroom spawn growth within the bag. However, the bag is easily fabricated and can be produced in different sizes while still achieving desired gas exchange.

The invention also comprises a method of making a mushroom spawn bag which comprises:

(1) providing a transparent, heat-sealable, non-permeable plastic sheet material having on folding adjacent side edges and non-adjacent end edges, (2) placing a filter strip against the said side edges of said transparent plastic sheet before or after folding of the transparent sheet,
  said filter strip comprising:
  (a) a central sheet of a microporous plastic sheet permeable to gas, e.g. moist air, and impermeable to water, plastic, and
  (c) an internally facing sheet of permeable plastic, at least one of (b) and (c) contacting said transparent sheet being heat-sealable, said filter strip being relatively narrow in width as compared to its length, said length extending the length of the bag at said adjacent edges; and (3) heat sealing one of said non-adjacent self-contacting end edges of said transparent plastic sheet and heat sealing the edges of said filter strip to said side edges of said transparent plastic sheet thereby defining a mushroom spawn bag.

The sterilizable bag of the invention is very useful as compared to bags of the prior art because in the sterile bag of the invention, the filter strip is an integral part of the bag. Since the filter strip forms its own bond with the sides of the bag, the bag does not require an additional layer of plastic to bridge over the plastic to provide additional strength. This makes for a simpler type of bag construction and uses much less materials by not requiring the large overlap of the prior art bags.

By utilizing a very narrow width filter strip in relationship to the overall bag width it offers a significant improvement in visibility. In order to achieve an even gassing of the contents, such as mushroom spawn, through the bag, the filter strip provides an even gas exchange rate along the length of the bag. Through the use of the laminated material, the filter strip can be kept to a minimal size while achieving gas exchange objectives consistently throughout the bag. By utilizing a strip type filter as opposed to a patch or other type of spot filter, a preferred ratio of filter area to maximum interior mass can be maintained so that the bag provides an optional environment for growth, storage and shipment of mushroom spawn while maintaining a sterile seal.

The filter strip of the bag of the invention is made of a laminate comprising filtration and bonding materials that provide a high level of filtration while achieving a controllable level of gas exchange. The filter strip is very narrow by comparison with the large filters of bags of the prior art which allows for a larger portion of the bag of the invention to be left clear and easily viewed for quality control and customer inspection. By use of the type of filtration provided by the present filter strip and the proper matching of its gas exchange rate to bag mass, there is a reduction in the filtration area of the bag without risking desiccation of the contents due to a high gas exchange rate, As mentioned earlier, most bags of the prior art utilize a large filter patch or strip which results in a very high rate of gas exchange. This high gas exchange rate of the prior art bags also dries out material directly under the filter patch prohibiting healthy mycelial growth.

The filter strip in the bag of the invention provides for an ease of sealing of the bag which was not possible when the prior art bag was largely or entirely made of porous material in which the porousness would often be destroyed on heat sealing.

DESCRIPTION OF SPECIFIC EMBODIMENTS

The sterile bag of the invention will now be described in detail with reference to the accompanying FIGS. 1 and 2.

Figure 1:
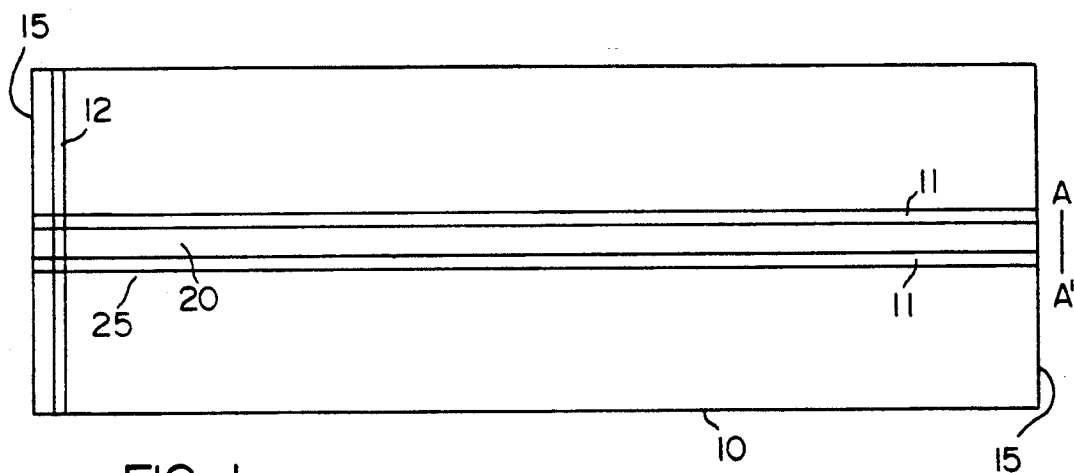
FIG. 1 is a top view of a sterile bag of the invention with the side edges sealed to the filter strip and one non-adjacent end edge unsealed and one non-adjacent edge sealed.

As shown in FIG. 1, the major part of the bag is composed of a transparent, heat-sealable, non-permeable plastic sheet material (10) that can be easily folded and the edges heat sealed (11). The transparent plastic sheet (10) has the adjacent side edges (25) folded over so that the sheet forms the walls of the bag. One of the non-adjacent end edges (15) is initially open and will be eventually heat-sealed (12). This transparent sheet (10) can be made of any strong heat-sealable material that can be sterilized at above 120° C., preferably to 130° C., and that will be compatible with the materials the bag is intended to hold. Suitable materials for the transparent plastic sheet include polypropylene, polyester or the like, preferably a laminate, such as polypropylene and polyester or preferably polypropylene and Nylon plastics and the like.

Polypropylene has long been utilized in autoclavable plastic bags but is not temperature stable above 120° C. Due to the nature of the material comprising the substrate and its density it is advantageous to autoclave at temperatures of 125° to 130° C. At these temperatures polypropylene becomes unstable and begins to melt. This can result in minor to severe deformation of the bag including structural failure. By laminating the polypropylene to a more temperature tolerant plastic, such as Nylon, the bag retains its structure throughout autoclaving with only minimal, if any deformation.

Nylon and polypropylene both exhibit excellent levels of clarity which is not effected by autoclaving at temperatures up to 130° C. With a mushroom spawn container it is important that the container have excellent optical properties as it is essential to be able to visually inspect the product for proper types of mycelial growth and the absence of any contaminants Nylon or polyester can be used by themselves. They exhibit excellent structural characteristics, such as clarity, strength, and temperature tolerance, but have less desirable heat sealing capabilities than laminates The bag design is such that it provides for all heat welds to be made to one side of the sheet. This allows the bag to preferably be made from a laminate, such as a laminate of polypropylene and polyester, or preferably of polypropylene and Nylon, which incorporates the flexibility, heat sealability, and clarity of polypropylene along with the high temperature to and clarity of Nylon or polyester.

The use of the preferred transparent plastic sheet comprising a laminate provides a high degree of clarity to facilitate quality control inspection for healthy growth control and for signs of contamination.

The transparent plastic sheet (10) can be any desired thickness and is usually from about 2 mil to about 6 mil in thickness, preferably about 2 to 3 mil in thickness length and width of the bag of the invention can vary according to the specifications of the contents for which the bag is intended. While the bag can be any rectangular shape and size desired, it is usually one in which the adjacent sides of the rectangle are not of equal length. The width of the bag should be about 40% and 50% of the length of the bag to avoid excessive mass of the contents varied depending upon the contents. For example, the adjacent side edges (25) parallel to the folds are usually considerably longer than the sides which form the non-adjacent end ends (15) perpendicular to the folds.

The bag thickness should be such that it allows for easy flexing of the bag materials during mechanical handling. An about three mil thickness of the bag materials discussed earlier works very well for mechanical processing of the bag while maintaining adequate strength and visibility.

Figure 2:
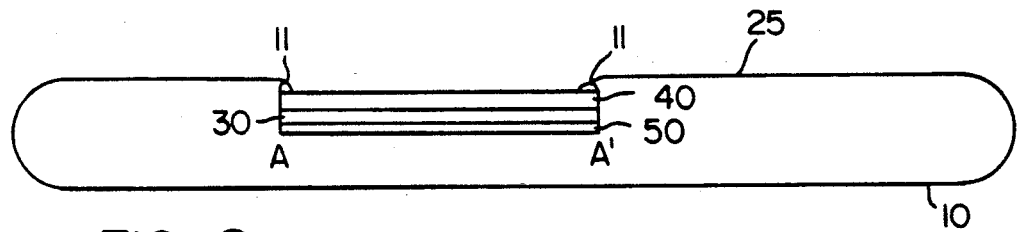
FIG. 2 is a cross-sectional end view of along A—A' of FIG. 1 and illustrates the laminated filter strip of the bag of the invention.

The filter strip (20) extends the length of the bag giving a very even level of gas distribution and comprises a three ply plastic laminate as shown in FIG. 2.

The filter strip (20) extends the length of the adjacent side edges (25) of the transparent plastic sheet (10) and is heat-sealable to the edges of the transparent plastic sheet to provide closing and sealing of the bag. The width of the filter strip or the bag is not critical and is usually determined by the ease of manufacture. The filter strip is usually relatively narrow in width as compared to length and the length of the filter strip extends the length of the bag. Usually the width of the filter strip is from about ½ to about 2 inches in width, preferably from about ¾ to about 1½ inches in width and preferably about 1 inch. Net filtration width can be as narrow as ¼ inch with heat seals of ⅛ to ¼ inch in width. The thickness of the filter strip is from about 2 to about 10 mils, preferably from about 5 to about 7 mils. The filter strip comprises about 2% to about 10% of the total bag surface area, preferably about 5%.

The relationship of the filter gas exchange rate to the mass of the bag is established by evaluating the cross sectional dimensions of the bag top to achieve a ratio of gas exchange per volume of interior mass to prevent drying or desiccation of the material.

The filter strip has a gas exchange rate for $CO_2$, $O_2$ and moisture exchange determined by the bag mass and the bag contents to provide a desired rate of gas exchange without desiccation of the contents of the bag which could result in desiccation of the mycelium. For example, when the bag contains mycelial growth medium, the gas exchange rate can be from approximately 5 Gurley to 10,000 Gurley seconds. A Gurley seconds is the time (in seconds) required for a fixed amount of air (100 cc's) to pass through a one square inch section of material at a standard pressure (approximately 4.88 psi). This is a commonly accepted standard of measurement within the filtration and membrane industry. Preferably, the gas exchange rate can be from about 0.01 cc's of gas per second per square inch of filter material at a standard pressure using a standard Gurley test up to about 20 cc's of gas per second per square inch and more preferable from about 0.5 to about 10 cc's.

For the production of mushroom spawn in the bag, it has been found that a gas exchange rate of about 5 cc's per square inch with a ¼ to ½ inch wide filter strip provides an adequate gas exchange while preventing desiccation in a bag with a cross section resulting in a maximum depth of spawn material from the filter strip of approximately 4.5 to 5 inches.

The laminated layers of the filter strip are bonded through the use of a conventional high temperature adhesive. The adhesive is applied in such a manner as to provide minimal interference with the gas exchange rate. This is usually accomplished by applying it in a swirl pattern which has an insignificant impact upon the gas exchange rate. In one embodiment of the invention, externally facing and internally facing layers of the filter strip are independently either woven or non woven and have an open fibrous type matrix which prevents the top and bottom layers from occluding gas flows. When the transparent plastic sheet of the bag is heat sealed to the filter strip, it either melts into the matrix of the externally facing layer of the filter strip if it is made from a high temperature material, such as polyester, or fuses with the externally facing layer if it is a low temperature plastic, such as polypropylene. In either method, the plastic from the transparent plastic sheet of the bag layer (internally facing layer) and the externally facing layer of the filter strip are bonded and sealed completely to prevent the intrusion of potential contaminants through the heat seal area. In one embodiment of the invention for easier mechanical bonding, the externally facing layer is a woven material and the internally facing layer is a non-woven material.

While the bag of the invention is usually prepared with a single filter strip, additional filter strips can be added in parallel. In the latter case, some of the adjacent side edges are of different pieces of the transparent plastic sheet rather than from a single sheet, or the single transparent plastic sheet can be slit during bag construction to allow the insertion and heat sealing of the filter strip.

The central ply sheet (30) of the filter strip is a sheet of microporous plastic sheet permeable to gases, e.g., moist air, and impermeable to water. Suitable materials for this microporous sheet (30) are hydrophobic, extremely high temperature plastic autoclavable above about 120° C. and include polytetrafluoroethylene (PTFE) or other acceptable materials including various forms of spun fibers having the submicron or near micron filtration levels and the high temperature tolerance. A suitable microporous PTFE material is known as Gortex or any of the microporous plastic materials known in the art which will not be adversely affected by heal sealing. The size of the pores should be sufficient to restrict passage of mushroom spores, bacteria and water droplets, but large enough to allow for the passage of gases, such as moisture, oxygen, and carbon dioxide. For example, the effective filtration level of the filter strip should be from about 0.03 to about 1.0 microns in particle size. Preferably, for a bag holding mushroom mycelium, the pore size is from about 0.1 to about 0.5% microns. The thickness of the microporous sheet is not critical because strength of the laminate is provided by one or more of the outer layers. The thickness of the microporous layer is usually from about 1 to about 2 mils.

While the filter strip can be constructed so that it can be sealed by the top or bottom layer to the transparent plastic sheet, for ease of manufacture the filter strip is sealable to the transparent plastic strip by the bottom layer. Three ply plastic laminates of the desired permeability are available commercially and are usually a woven plastic laminate, such as used in insulated garments.

Depending on how the bag is assembled, the layer of the laminate adjacent to the transparent sheet, which is one of the two layers (40) and (50), is heat-sealable. The other layer provides any additional strength needed in the filter strip when in combination with the other two layers. The bag can be assembled by first folding the transparent sheet and placing the filter strip on top of the folded transparent sheet. In this case, the layer (40) in FIG. 2 is the outer layer which is heat-sealable to the transparent sheet and layer (50) is the inner layer. With reference to this preferred embodiment the two outside layers of the laminate will be described in more detail below. When the bag is assembled in the preferred manner by folding the transparent sheet over the filter strip, the properties of the two layers will be reversed.

The externally facing or outer layer (40) of the laminate of the filter strip is of a heat-sealable, permeable plastic. Suitable heat-sealable, permeable plastics are known in the packaging art and include polypropylene, polyester or the like. The thickness of this layer is not critical. The thickness of the top or bottom layers is usually based on the ability to heat seal with the interior layer of the bag and to provide support and protection for the microporous membrane layer (30). If a mechanical bond is utilized, such as with polyester or nylon laminate filter strip and a polypropylene transparent plastic sheet for the bag, when the laminate should not be so thick as to prevent a full penetration of the polypropylene through the laminate. If a polypropylene to polypropylene weld is to be performed, the thickness is less important as the materials can be easily heat fused in a solid seam.

In an alternate embodiment, the externally facing layer provides sufficient strength to the filter strip when taken with the other two layers.

The internally facing or inside layer (50) of the laminate of the filter strip is a tough, autoclavable, permeable plastic. Suitable permeable plastics are well known in the art of packaging and include polypropylene, polyester and the like. This layer serves the primary function of regulating the gas exchange rate in conjunction with the primary central filter layer.

By varying the thickness and the type of construction of the internally facing layer (50), its permeability and strength can be adjusted. Utilizing spun/non woven type materials provides a high degree of porosity while also providing the basis for effective heat sealing. If the fiber of the inside layer (50) is made from polyester, it can be heat sealed by penetrating the molten polypropylene of the transparent sheet of the bag under pressure into the polyester fibers of the inside layer of the filter strip thereby creating a mechanical bond of the two materials. The polyester layer of the filter strip being unaffected by autoclaving temperatures remains quite porous while still providing protection to the interior membrane.

Another application utilizes a different type of material, such as polypropylene for the protective layer (50).

This material provides protection to the microporous membrane (30) while providing a high level of porosity (if a fibrous type of polypropylene is used) that can be very easily heat welded to the transparent plastic sheet of the bag.

This internally facing or inside layer also can provide strength. In one embodiment of the invention, the internally facing layer is present to provide the heat-sealable material for closing and sealing the bag of the invention. This layer also protects the central filter layer from damage by the mycelium and grain in the bag.

The externally facing and internally facing permeable layers can have perforations or pores of from about 0.3 to about 2 microns, preferably from about 0.3 to about 0.7 microns.

All of the plastic material used constructing the bag of the invention are sterilizable materials and the bag contents can be presterilized or the bag ca sealed and then the contents can be sterilized by known methods, such as treatment with steam, usually in an autoclave at 125° to 130° C., or with ethylene oxide.

A typical bag is about 18–24 inches in length and 8–10 inches wide. Other sizes can be usefully prepared.

The invention also comprises a method of making a mushroom spawn bag which comprises:

(1) providing a transparent, heat-sealable, non-permeable plastic sheet having on folding adjacent side edges and non-adjacent self-contacting end edges, (2) placing a filter strip against the side edge of said transparent plastic sheet before or after folding said transparent sheet, said filter strip comprising:

(a) a central sheet of a microporous plastic sheet permeable to gas, e.g., moist air, and impermeable to water, (b) an externally facing sheet of a permeable plastic, and (c) an internally facing sheet of permeable plastic, at least one of (b) and (c) contacting said transparent sheet being heat-sealable, said filter strip being relatively narrow in width compared to its length, said length extending the length of the side edge of said bag at said adjacent edges; and (3) heat sealing one of said self-contacting non-adjacent end edges of said transparent plastic sheet and heat sealing the edges of said filter strip to said side edges of said transparent plastic sheet, thereby defining a mushroom spawn bag.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A sterilizable bag, comprising:
   (1) a sheet of transparent, heat-sealable, non-permeable plastic material having side edges folded over to provide adjacent side edges and non-adjacent self-contacting end edges; and
   (2) a laminated plastic filter strip in contact with and heat sealed to both of said adjacent edges comprising:
      (a) a central sheet of microporous plastic permeable to gas but impermeable to water,
      (b) an externally facing sheet of permeable plastic, and
      (c) an internally facing sheet of permeable plastic,
   wherein said sheet (a) is bonded to each of (b) and (c) over the entire width of said sheets to provide a permeable laminated strip and at least one of (b) and (c) contacting said transparent sheet is heat sealed to said adjacent side edges, said filter strip being relatively narrow in width compared to its length, said length extending the length of the bag at said adjacent edges; and
   wherein one of said self-contacting end edges has been heat sealed to said filter strip, thereby defining an open-ended bag area.

2. The bag according to claim 1 wherein the central sheet of the filter strip is made of polytetrafluoroethylene.

3. The bag according to claim 2 wherein said filter strip has an gas exchange rate determined by the bag mass and bag contents to provide gas exchange without desiccation of said bag contents.

4. The bag according to claim 3 wherein the gas exchange rate of the filter strip is from about 0.01 cc's of gas per second per square inch of filter material at a standard pressure using a standard Gurley test up to about 20 cc's of gas per second per square inch.

5. The bag according to claim 4 wherein said gas exchange rate is from about 0.5 cc's of gas per second per square inch to about 10 cc's of gas per second per square inch using a standard Gurley test.

6. The bag according to claim 5 wherein the gas exchange rate is about 5 cc's per second per square inch using a standard Gurley test.

7. The bag according to claim 1 wherein the externally facing layer of the filter strip comprises polypropylene.

8. The bag according to claim 1 wherein the internally facing layer of the filter strip comprises heat-sealable polypropylene.

9. The bag according to claim 1 wherein the externally facing sheet of the filter strip is woven and the internally facing sheet is non-woven.

10. The bag according to claim 1 wherein the transparent, heat-sealable plastic sheet comprises a laminate of polypropylene and polyester or polypropylene and Nylon.

11. The bag according to claim 1 comprising more than one transparent plastic sheet and more than one filter strip.

12. A method of making a mushroom spawn bag which comprises:
   (1) placing mushroom spawn ingredients on a transparent, heat-sealable, non-permeable plastic sheet having on folding adjacent side edges and non-adjacent self-contacting end edges,
   (2) placing a filter strip against the side edge of said transparent plastic sheet before or after folding said transparent sheet,
   said filter strip comprising:
      (a) a central sheet of a microporous plastic sheet permeable to gas and impermeable to water,
      (b) an externally facing sheet of a permeable plastic, and
      (c) an internally facing sheet of permeable plastic, at least one of (b) and (c) contacting said transparent sheet being heat-sealable,
   said filter strip being relatively narrow in width compared to its length, said length extending the length of the side edge of said bag at said adjacent edges; and (3) heat sealing one of said self-contacting nonadjacent end edges of said transparent plastic sheet and heat sealing the edges of said filter strip to said side edges of said transparent plastic sheet, thereby defining a mushroom spawn bag.

13. The method according to claim 12 wherein the central sheet of the filter strip is made of polytetrafluoroethylene.

14. The method according to claim 12 wherein said filter strip has an gas exchange rate determined by the bag mass and bag contents to provide gas exchange without desiccation of said bag contents.

15. The method according to claim 14 wherein the gas exchange rate of the filter strip is from about 0.01 cc's of gas per second per square inch of filter material at a standard pressure using a standard Gurley test up to about 20 cc's of gas per second per inch.

16. The bag according to claim 15 wherein said gas exchange rate is from about 0.5 cc's of gas per second per square inch to about 10 cc's of gas per second per square inch using a standard Gurley test.

17. The bag according to claim 16 wherein the gas exchange rate is about 5 cc's per second per square inch using a standard Gurley test.

18. The method according to claim 12 wherein the externally facing layer of the filter strip is a polypropylene.

19. The method according to claim 12 wherein the internally facing layer of the filter strip is a heat-sealable polypropylene.

20. The method according to claim 12 wherein the transparent plastic sheet is made of a laminate of polypropylene and polyester or polypropylene and Nylon.

21. The bag according to claim 12 comprising more than one transparent plastic sheet and more than one filter strip.

* * * * *